United States Patent
Zhai et al.

(10) Patent No.: US 9,837,807 B2
(45) Date of Patent: Dec. 5, 2017

(54) CABLE JOINT PROTECTION BOX

(71) Applicant: ZTE CORPORATION, Shenzhen, Guangdong Province (CN)

(72) Inventors: Shixuan Zhai, Shenzhen (CN); Haiyan Qin, Shenzhen (CN)

(73) Assignee: XI'AN ZHONGXING NEW SOFTWARE CO. LTD., Xi'an (CN)

(*) Notice: Subject to any disclaimer, the term of this patent is extended or adjusted under 35 U.S.C. 154(b) by 0 days.

(21) Appl. No.: 15/036,053

(22) PCT Filed: May 20, 2014

(86) PCT No.: PCT/CN2014/077911
§ 371 (c)(1),
(2) Date: May 11, 2016

(87) PCT Pub. No.: WO2015/067024
PCT Pub. Date: May 14, 2015

(65) Prior Publication Data
US 2016/0285249 A1 Sep. 29, 2016

(30) Foreign Application Priority Data
Nov. 11, 2013 (CN) .................... 2013 2 0709394 U (51) Int. Cl.
*H02G 15/10* (2006.01)
*H02G 15/113* (2006.01)
*H02G 15/013* (2006.01)

(52) U.S. Cl.
CPC ......... *H02G 15/113* (2013.01); *H02G 15/013* (2013.01)

(58) Field of Classification Search
USPC .................................................. 174/72 A, 92
See application file for complete search history.

(56) References Cited

U.S. PATENT DOCUMENTS 5,247,135 A * 9/1993 Rebers ................ H02G 15/117
174/41

FOREIGN PATENT DOCUMENTS

CN 101409440 A 4/2009
CN 201562941 U 8/2010
(Continued)

OTHER PUBLICATIONS

European Search Report for Application No. 14860128.9: dated Nov. 2, 2016.
(Continued)

*Primary Examiner* — Dhirubhai R Patel
(74) *Attorney, Agent, or Firm* — Koppel, Patrick, Heybl & Philpott (57) ABSTRACT

The present invention provides a cable joint protection box, which includes a buckle, at least one abutting piece, and a box body formed by two half-boxes. The two half-boxes are in rotatable pivot joint at one side of the box body via a pin, and the two half-boxes are buckled at the other side of the box body via the buckle. A dovetail groove is disposed on a front surface of the buckle. At least one through hole which penetrates through the buckle is disposed at a bottom of the dovetail groove in the buckle. A dovetail protrusion slidably buckled with the dovetail groove of the buckle is disposed on the box body. When the cable joint protection box is locked, the abutting piece is fixedly connected to the buckle, and the abutting piece penetrates through the through hole in the buckle and abuts against the box body.

19 Claims, 5 Drawing Sheets

(56) References Cited

FOREIGN PATENT DOCUMENTS

| CN | 201994622 A1 | 9/2011 |
|---|---|---|
| CN | 201994622 U | 9/2011 |
| CN | 202034750 U | 11/2011 |
| DE | 4321700 A1 | 1/1995 |
| EP | 1981140 A2 | 10/2008 |

OTHER PUBLICATIONS

International Search Report (Form PCT/ISA/210) for International Application No. PCT/CN2014/077911 dated Aug. 13, 2014.

* cited by examiner

CABLE JOINT PROTECTION BOX

TECHNICAL FIELD

The disclosure relates to a cable joint protection apparatus, and in particular to a cable joint protection box.

BACKGROUND

In the related art, devices for electronic products are often connected with a great number of cables. In an outdoor installation process, it is necessary to provide strict watertight protection for various cables. Currently common protection solutions comprise: wrapping a cable joint with mastics or tapes; and wrapping the cable joint with a heat-shrinkable bushing. However, the solutions have the disadvantages of complicated installation and inconvenient maintenance.

SUMMARY

A cable joint protection box is provided by embodiments of the disclosure, so as to at least fulfil the aims of convenient installation and convenient maintenance.

A cable joint protection box is provided, which comprises a buckle, at least one abutting piece, and a box body formed by two half-boxes. The two half-boxes are in rotatable pivot joint at one side of the box body via a pin, and the two half-boxes are buckled at the other side of the box body via the buckle. A dovetail groove is disposed on a front surface of the buckle. At least one through hole which penetrates through the buckle are disposed at a bottom of the dovetail groove in the buckle. A dovetail protrusion slidably buckled with the dovetail groove of the buckle is disposed on the box body. When the cable joint protection box is locked, the abutting piece is fixedly connected to the buckle, and the abutting piece penetrates through the through hole in the buckle and abuts against the box body.

Optionally, the abutting piece is a bolt, which comprises a threaded stud and a nut connected to the threaded stud, and the through hole has internal threads.

Optionally, the cable joint protection box further comprises at least one limiting barrel, wherein a limiting ring protrudes on an inner circumferential surface of the limiting barrel, an inner diameter of the limiting ring is smaller than a diameter of the nut of the abutting piece, the limiting barrel is fixed to the buckle and covers the abutting piece, and the abutting piece is limited to stay inside the limiting barrel.

Optionally, an installation barrel protrudes out of a position, corresponding to the through hole, on the back surface of the buckle, and at least one clamping portion is arranged on an inner circumferential surface of the installation barrel; and the limiting barrel is installed in the installation barrel, and at least one matching portion to be clamped with the clamping portion is arranged on an outer circumferential surface of the limiting barrel.

Optionally, the clamping portion on the inner circumferential surface of the installation barrel is a clamping hole, and the matching portion on the outer circumferential surface of the limiting barrel is a clamping hook.

Optionally, a gap is disposed on the outer circumferential surface of the limiting barrel, and the matching portion is suspended in the gap.

Optionally, at least one clamping sheet protrudes from one of the two half-boxes to the other half-box at one side, connected to the buckle, of the box body; and at least one clamping groove to be clamped with the clamping sheet is recessed at positions, corresponding to the clamping sheet, on the other half-box.

Optionally, a recess matched with an abutting end of the abutting piece is disposed at a position, abutting against the abutting piece, on the box body.

Optionally, the recess is disposed on the clamping sheet of the half-boxes.

Optionally, the pin and one of the two half-boxes are integrally formed, a C-shaped clamping hook corresponding to the pin is arranged on the other half-box, and the pin and the C-shaped clamping hook are arranged in a segmented correspondence manner.

When the box body is opened, a cable joint can be put into the box body of the cable joint protection box disclosed by the disclosure. The process of putting the cable joint is simple and convenient, and can be conveniently operated by a user. The operation of locking the buckle and the box body through slidably buckling is simple, and the closing reliability of locking is relatively high. The abutting piece can achieve the effect of limiting the buckle and the box body from moving with respect to each other, so as to prevent the dovetail protrusion of the box body from slipping out of the dovetail groove of the buckle, thereby ensuring the locking safety and reliability of the box body. In a post-maintenance process, it is only necessary to loosen the abutting piece and pull the buckle away from the box body, so that the box body can be opened. The disassembly process is simple and convenient, and facilitates the post-maintenance of the cable joint. The cable joint protection box can be used again after being disassembled, thereby achieving the effects of economy and environmental protection.

The aim fulfilment, functional characteristics and advantages of the disclosure will be further described with reference to the embodiments and the drawings.

DETAILED DESCRIPTION OF THE EMBODIMENTS

It should be understood that the embodiments described here are only intended to explain the disclosure and do not limit the disclosure. The technical features in the disclosure can be randomly combined under the condition of no conflicts.

Figure 1:
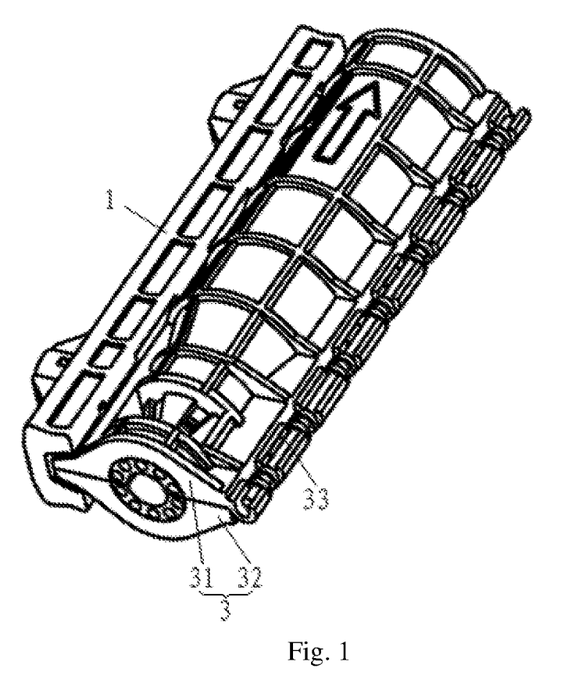
FIG. 1 is an assembly diagram of a cable joint protection box according to a preferred embodiment of the disclosure.
Figure 2:
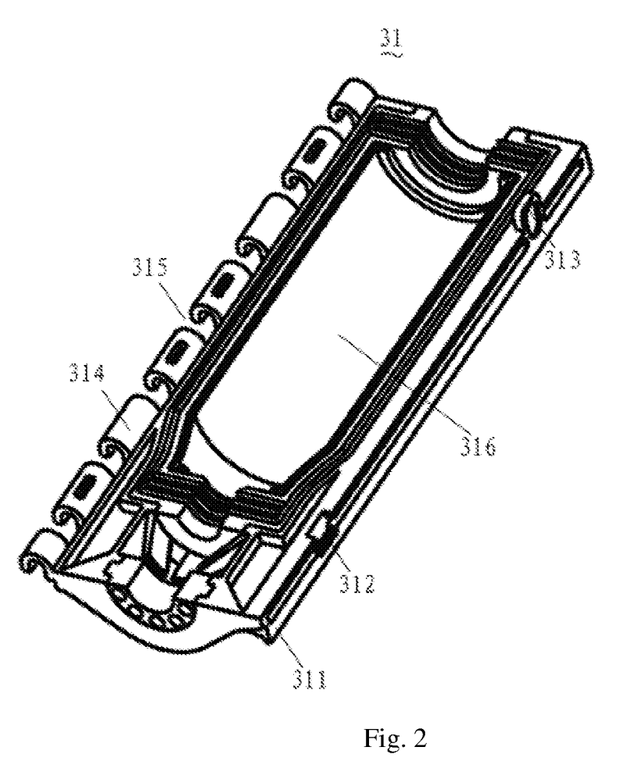
FIG. 2 is a structural diagram of a half-box in FIG. 1.
Figure 3:
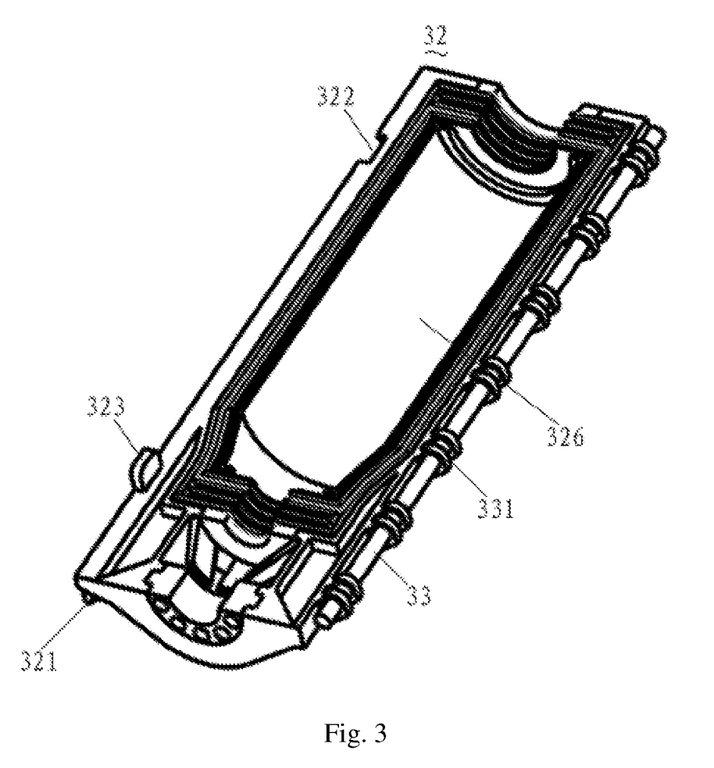
FIG. 3 is a structural diagram of the other half-box in FIG. 1.
Figure 4:
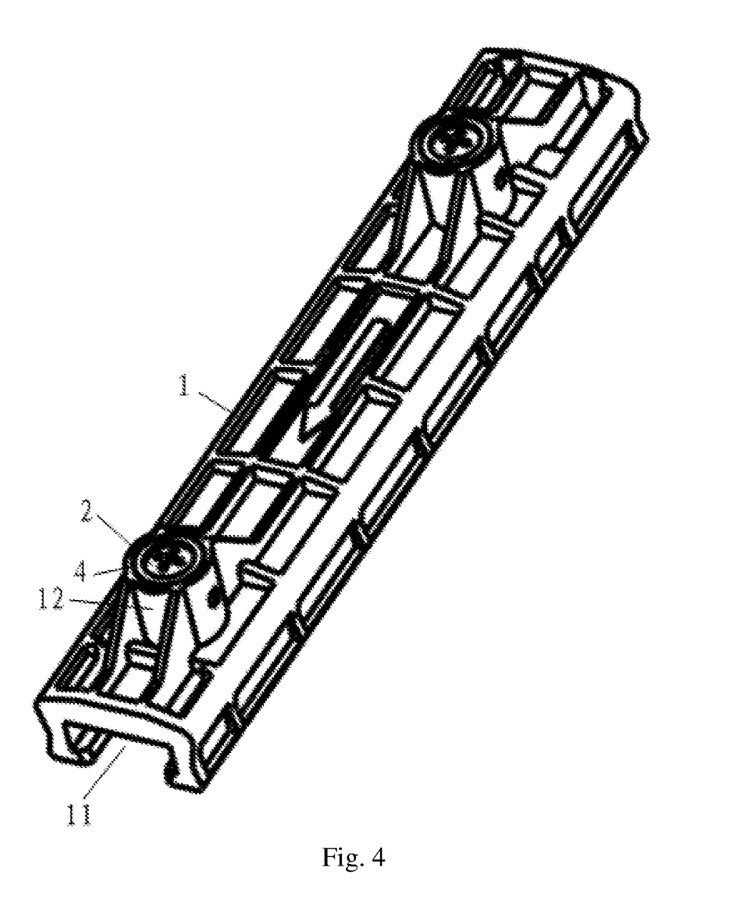
FIG. 4 is an assembly diagram of a buckle and an abutting piece in FIG. 1.
Figure 5:
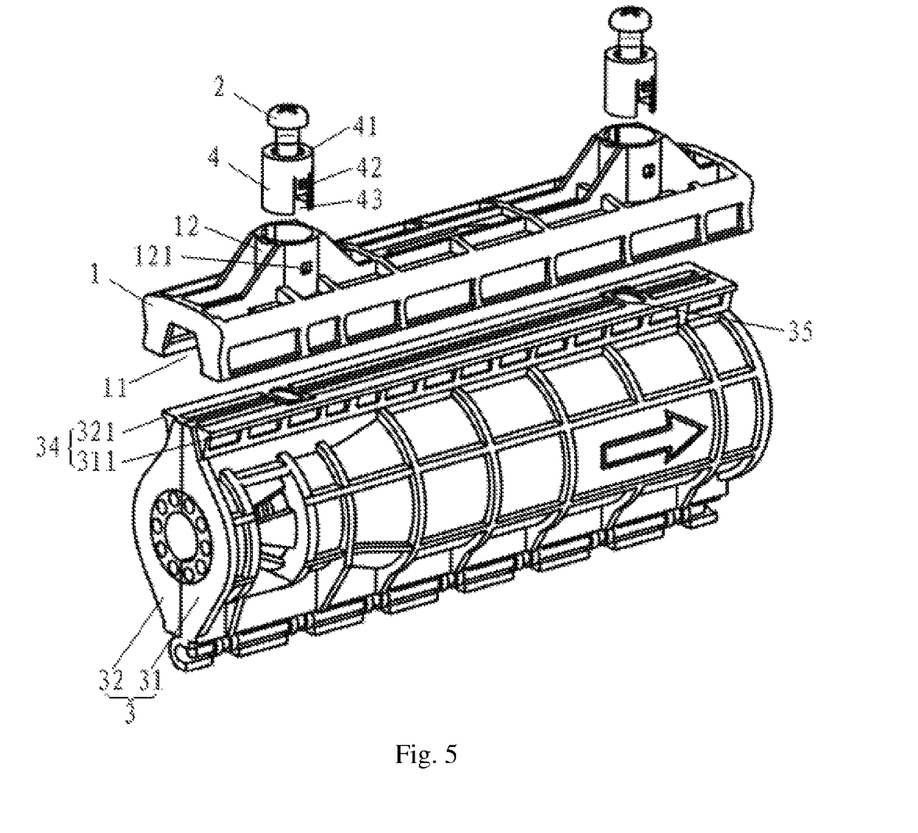
FIG. 5 is an exploded diagram of FIG. 1.
Figure 6:
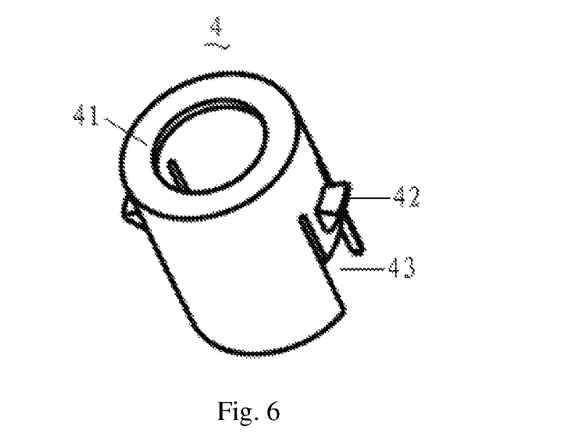
FIG. 6 is a structural diagram of a limiting barrel in FIG. 5.

FIG. 1 is an assembly diagram of a cable joint protection box according to a preferred embodiment of the disclosure; FIG. 2 is a structural diagram of a half-box in FIG. 1; FIG. 3 is a structural diagram of the other half-box in FIG. 1; FIG. 4 is an assembly diagram of a buckle and at least one abutting piece in FIG. 1; FIG. 5 is an exploded diagram of FIG. 1; and FIG. 6 is a structural diagram of a limiting barrel in FIG. 5.

As shown in FIG. 1 to FIG. 5, the disclosure discloses a cable joint protection box, which comprises a buckle 1, at least one abutting piece 2, and a box body 3 formed by two half-boxes 31, 32. An accommodating chamber is disposed in the box body 3 and is configured to store a cable joint, and a cable outlet is disposed at each of two ends of the accommodating chamber in the box body 3. Specifically, a half-chamber 316 is disposed on the half-box 31, and a half-chamber 326 is disposed on the half-box 32. When the two half-boxes 31, 32 are buckled, the two half-chambers 316, 326 are closed to form the accommodating chamber and the cable outlets. The two half-boxes 31, 32 are in rotatable pivot joint at one side of the box body 3 via a pin 33, and the two half-boxes 31, 32 are buckled at the other side of the box body 3 via the buckle 1. Specifically, one surface, facing the box body 3, of the buckle 1 is a front surface, and an opposite surface of the front surface is a back surface. A dovetail groove 11 is disposed on the front surface of the buckle 1, and at least one through hole (invisible in Figure) which penetrates through the buckle 1 from the front surface to a back surface of the is disposed at the bottom of the dovetail groove 11 in the buckle 1. A dovetail protrusion 34 slidably buckled with the dovetail groove 11 of the buckle 1 is disposed on the box body 3. Specifically, the dovetail protrusion 34 is composed of two half-protrusions 311, 312, the half-protrusion 311 is arranged on the half-box 31, and the half-protrusion 312 is arranged on the half-box 32. When the two half-boxes 31, 32 are buckled, the two half-protrusions 311, 312 form the dovetail protrusion 34 matched with the dovetail groove 11 of the buckle 1. In order to be capable of improving the locking stability of the box body 3, when the cable joint protection box is locked, the abutting piece 2 is fixedly connected to the buckle 1, and the abutting piece 2 penetrates through the through hole in the buckle 1 and abuts against the box body 3.

In a locking process of the cable joint protection box provided by the disclosure, firstly, the pivoted half-boxes 31, 32 are buckled with each other to form the box body 3 having the accommodating chamber for accommodating the cable joint; secondly, the end of the dovetail groove 11 of the buckle 1 is aligned with that of the dovetail protrusion 34 on the box body 3, and then the buckle 1 and the box body 3 are pushed to move with respect to each other, such that the dovetail groove 11 and the dovetail protrusion 34 are buckled with each other, thereby achieving the effect of locking the box body 3; and thirdly, the abutting piece 2 penetrates through the through hole of the buckle 1 and abuts against the surface of the box body 3, such that the dovetail groove 11 further clamps the dovetail protrusion 34. When the box body 3 is opened, the cable joint can be put into the box body. The process of putting the cable joint is simple and convenient, and can be conveniently operated by a user. The operation of slidably buckling and locking the buckle 1 and the box body 3 is simple, and the closing reliability of locking is relatively high. The abutting piece 2 can achieve the effect of limiting the buckle 1 and the box body 3 from moving with respect to each other, so as to prevent the dovetail protrusion 34 of the box body 3 from slipping out of the dovetail groove 11 of the buckle 1, thereby ensuring the locking safety and reliability of the box body 3.

Furthermore, a sealing ring or a sealing adhesive (unmarked in Figure) can be arranged on the buckled surface of the half-box 31 and the half-box 32 and is configured to enhance the waterproof ability of the box body 3.

When it is necessary to process the cable joint in a post-maintenance process, it is only necessary to loosen the abutting piece 2 and pull the buckle 1 away from the box body 3, so that the box body 3 can be opened. The disassembly process is simple and convenient, and facilitates the post-maintenance of the cable joint. The cable joint protection box can be used again after being disassembled, thereby achieving the effects of economy and environmental protection.

The abutting piece 2 is fixedly connected to the buckle 1, wherein the fixed connection can be clamping, screwing or adhering. As shown in FIG. 5, specifically, the abutting piece 2 is a bolt, which comprises a threaded stud and a nut connected to the threaded stud, and the through hole in the buckle 1 has internal threads. Thus, the stud of the abutting piece 2 is screwed into the through hole, so that the abutting piece 2 can be fixedly connected to the buckle 1. The abutting piece 2 is screwed to extend out of the through hole of the buckle 1, and namely abuts against the box body 3, so as to position the buckle 1 and the box body 3 and avoid the buckle 1 and the box body 3 from sliding with respect to each other during operation.

Certainly, in other embodiments, the abutting piece 2 can be provided with a camshaft pivoted on the buckle 1, and by rotating the camshaft, the abutting piece protrudes out of the through hole of the buckle 1 and abuts against the box body 3. The abutting piece 2 can also be a cylinder, and an obstruction portion protrudes on an outer surface of the abutting piece 2. A stop ring is protruded in the through hole of the buckle 1, and a gap allowing the penetration of the obstruction portion on the outer surface of the abutting piece 2 is disposed on the stop ring. After the obstruction portion of the abutting piece 2 penetrates through the gap, the abutting piece 2 is screwed, so that the abutting piece 2 is clamped in the through hole of the buckle 1 and abuts against the box body 3. The abutting piece 2 can be of other structures, those skilled in the art may think of this, and detailed descriptions are no longer carried out here.

As shown in FIG. 5 and FIG. 6, on the basis of the embodiment, preferably, the cable joint protection box further comprises at least one limiting barrel 4, a limiting ring 41 protrudes on an inner circumferential surface of the limiting barrel 4, and the inner diameter of the limiting ring 4 is smaller than the diameter of the nut of the abutting piece 2. The limiting barrel 4 is fixed to the buckle 1 and covers the abutting piece 2, the abutting piece 2 is limited to stay inside the limiting barrel 4, and namely, the nut of the abutting piece 2 cannot penetrate through the limiting ring 41 in the limiting barrel 4. The limiting piece 2 is limited therein via the limiting barrel 4, so that the abutting piece 2 and the buckle 1 are prevented from disengaging from each other and falling in an installation process, thereby avoiding a constructor from looking for a falling locking piece during assembly, facilitating installation and increasing the construction efficiency. During assembly, the abutting piece 2 can be pre-screwed into the through hole of the buckle 1, and then the limiting barrel 4 is fixed to the buckle 1. When the buckle 1 is slidably buckled to a pre-set position of the box body 3, the constructor can exert a rotation force on the abutting piece 2 after penetrating through the limiting ring of the limiting barrel, so as to make the abutting piece 2 rotate to abut against the box body 3.

The limiting barrel 4 is fixed to the buckle 1, wherein the fixation can be clamping, screwing or adhering. Specifically, in the embodiment, an installation barrel 12 protrudes out of a position, corresponding to the through hole, on the back surface of the buckle 1, and at least one clamping portion 121 is arranged on an inner circumferential surface of the installation barrel 12. The limiting barrel 4 is installed in the installation barrel 12, and at least one matching portion 42 to be clamped with the clamping portion 121 is arranged on an outer circumferential surface of the limiting barrel 4.

During assembly, the limiting barrel 4 is inserted into the installation barrel 12, and is clamped with the matching portion 42 via the clamping portion 121, so that the limiting barrel 4 is fixed to the buckle 1. Specifically, the clamping portion 121 on the inner circumferential surface of the installation barrel 12 is a clamping hole, and the matching portion 42 on the outer circumferential surface of the limiting barrel 4 is a clamping hook. Namely, the clamping hook protruding out of the outer circumferential surface of the limiting barrel 4 slides along the inner circumferential surface of the installation barrel 12, and slides to be buckled into the clamping hole in the inner circumferential surface of the installation barrel 12, so as to lock the limiting barrel 4 and the buckle 1.

In order to conveniently install the limiting barrel 4 in the installation barrel 12, a gap 43 is disposed on the outer circumferential surface of the limiting barrel 4, and the matching portion 42 is suspended in the gap 43. By suspending the matching portion 42 which is shaped like a cantilever beam in the gap 43, the matching portion 42 is easily deformed. When the limiting barrel 4 is installed in the installation barrel 12, a friction force between the matching portion 42 of the limiting barrel 4 and the inner circumferential surface of the installation barrel 12 is decreased to facilitate installation.

As shown in FIG. 2 and FIG. 3, in order to be capable of avoiding easy displacement of the two half-boxes 31, 32 of the box body 3 due to an external force after being locked, at least one clamping sheet 313 or 323 protrudes from one of the two half-boxes to the other half-box at one side, connected to the buckle 1, of the box body 3; and at least one clamping groove 312 or 322 to be clamped with the clamping sheet 313 or 323 is recessed at positions, corresponding to the clamping sheet 313 or 323, on the other half-box. Specifically, in the embodiment, the clamping sheet 313 and the clamping groove 312 are disposed on the half-box 31 at an interval, and correspondingly, the clamping groove 322 matched with the clamping sheet 313 and the clamping sheet 323 matched with the clamping groove 312 are disposed on the half-box 32. Thus, a locating structure is also disposed on the opposite side of the pivoted side in the box body 3 so as to improve a locating effect of the box body 3 in locking.

As shown in FIG. 5, furthermore, a recess 35 matched with an abutting end of the abutting piece 2 is disposed at a position, abutting against the abutting piece 2, on the box body 3. Namely, the abutting end of the abutting piece 2 is inserted into the recess 35 of the box body 3, so that the abutting piece 2 better locates the two half-boxes 31, 32. Specifically, in the embodiment, there are a plurality of recesses 35, which are disposed on the clamping sheet 313 of the half-box 31 and the clamping sheet 323 of the half-box 32 respectively.

In order to make the cable joint protection box more portable, the pin 33 and one of the two half-boxes 31, 32 can be integrally formed, so that the pin of the cable joint protection box cannot be separated from the box body 3. Consequently, during installation, the pin will not disengage and more facilitates installation. Correspondingly, a clamping hook 314 corresponding to the pin 33 is arranged on the other half-box, and the clamping hook 314 is C-shaped preferably in order that the clamping hook 314 and the pin are buckled to close the two half-boxes 31, 32 to form the box body 3 capable of being opened and closed. As shown in FIG. 2 and FIG. 3, specifically, in the embodiment, the pin 33 and the half-box 32 are integrally formed, and the half-box 31 is provided with the corresponding C-shaped clamping hook 314. Furthermore, the pin 33 and the clamping hook 314 are arranged in a segmented correspondence manner. Namely, a plurality of protrusions 331 are arranged on the pin at intervals to divide the pin into multiple segments. A plurality of gaps 315 corresponding to the protrusions are arranged on the clamping hook 314 at intervals to divide the clamping hook 314 into multiple segments.

The above is only the preferred embodiments of the disclosure and does not limit the patent scope of the disclosure accordingly. The equivalent structure or equivalent flow conversion performed by utilizing the description and drawings of the disclosure or direct or indirect application to other relevant technical fields may fall within the patent protection scope of the disclosure in the same way.

What is claimed is:

1. A cable joint protection box, comprising a buckle, at least one abutting piece, and a box body formed by two half-boxes, wherein the two half-boxes are in rotatable pivot joint at one side of the box body via a pin; the two half-boxes are buckled at the other side of the box body via the buckle; a dovetail groove is disposed on a front surface of the buckle; at least one through hole which penetrates through the buckle and is disposed at a bottom of the dovetail groove in the buckle; a dovetail protrusion slidably buckled with the dovetail groove of the buckle is disposed on the box body; and when the cable joint protection box is locked, the abutting piece is fixedly connected to the buckle, and the abutting piece penetrates through the through hole in the buckle and abuts against the box body, wherein the abutting piece is a bolt, which comprises a threaded stud and a nut connected to the threaded stud, and the through hole has internal threads.

2. The cable joint protection box as claimed in claim 1, further comprising at least one limiting barrel, wherein a limiting ring protrudes on an inner circumferential surface of the limiting barrel, an inner diameter of the limiting ring is smaller than a diameter of the nut of the abutting piece, the limiting barrel is fixed to the buckle and covers the abutting piece, and the abutting piece is limited to stay inside the limiting barrel.

3. The cable joint protection box as claimed in claim 2, wherein an installation barrel protrudes out of a position, corresponding to the through hole, on the back surface of the buckle, and at least one clamping portion is arranged on an inner circumferential surface of the installation barrel; and the limiting barrel is installed in the installation barrel, and at least one matching portion to be clamped with the clamping portion is arranged on an outer circumferential surface of the limiting barrel.

4. The cable joint protection box as claimed in claim 3, wherein the clamping portion on the inner circumferential surface of the installation barrel is a clamping hole, and the matching portion on the outer circumferential surface of the limiting barrel is a clamping hook.

5. The cable joint protection box as claimed in claim 4, wherein a gap is disposed on the outer circumferential surface of the limiting barrel, and the matching portion is suspended in the gap.

6. The cable joint protection box as claimed in claim 2, wherein clamping sheets protrude from one of the two half-boxes to the other half-box at one side, connected to the buckle, of the box body; and clamping grooves to be clamped with the clamping sheets are recessed at positions, corresponding to the clamping sheets, on the other half-box.

7. The cable joint protection box as claimed in claim 3, wherein clamping sheets protrude from one of the two half-boxes to the other half-box at one side, connected to the buckle, of the box body; and clamping grooves to be clamped with the clamping sheets are recessed at positions, corresponding to the clamping sheets, on the other half-box.

8. The cable joint protection box as claimed in claim 4, wherein clamping sheets protrude from one of the two half-boxes to the other half-box at one side, connected to the buckle, of the box body; and clamping grooves to be clamped with the clamping sheets are recessed at positions, corresponding to the clamping sheets, on the other half-box.

9. The cable joint protection box as claimed in claim 5, wherein clamping sheets protrude from one of the two half-boxes to the other half-box at one side, connected to the buckle, of the box body; and clamping grooves to be clamped with the clamping sheets are recessed at positions, corresponding to the clamping sheets, on the other half-box.

10. The cable joint protection box as claimed in claim 2, wherein the pin and one of the two half-boxes are integrally formed, a C-shaped clamping hook corresponding to the pin is arranged on the other half-box, and the pin and the clamping hook are arranged in a segmented correspondence manner.

11. The cable joint protection box as claimed in claim 3, wherein the pin and one of the two half-boxes are integrally formed, a C-shaped clamping hook corresponding to the pin is arranged on the other half-box, and the pin and the clamping hook are arranged in a segmented correspondence manner.

12. The cable joint protection box as claimed in claim 4, wherein the pin and one of the two half-boxes are integrally formed, a C-shaped clamping hook corresponding to the pin is arranged on the other half-box, and the pin and the clamping hook are arranged in a segmented correspondence manner.

13. The cable joint protection box as claimed in claim 5, wherein the pin and one of the two half-boxes are integrally formed, a C-shaped clamping hook corresponding to the pin is arranged on the other half-box, and the pin and the clamping hook are arranged in a segmented correspondence manner.

14. The cable joint protection box as claimed in claim 1, wherein at least one clamping sheet protrudes from one of the two half-boxes to the other half-box at one side, connected to the buckle, of the box body; and at least one clamping groove to be clamped with the clamping sheet is recessed at positions, corresponding to the clamping sheet, on the other half-box.

15. The cable joint protection box as claimed in claim 14, wherein a recess matched with an abutting end of the abutting piece is disposed at a position, abutting against the abutting piece, on the box body.

16. The cable joint protection box as claimed in claim 15, wherein the recess is disposed on the clamping sheet of the half-box.

17. The cable joint protection box as claimed in claim 1, wherein the pin and one of the two half-boxes are integrally formed, a C-shaped clamping hook corresponding to the pin is arranged on the other half-box, and the pin and the C-shaped clamping hook are arranged in a segmented correspondence manner.

18. The cable joint protection box as claimed in claim 1, wherein clamping sheets protrude from one of the two half-boxes to the other half-box at one side, connected to the buckle, of the box body; and clamping grooves to be clamped with the clamping sheets are recessed at positions, corresponding to the clamping sheets, on the other half-box.

19. The cable joint protection box as claimed in claim 1, wherein the pin and one of the two half-boxes are integrally formed, a C-shaped clamping hook corresponding to the pin is arranged on the other half-box, and the pin and the clamping hook are arranged in a segmented correspondence manner.

* * * * *